United States Patent [19]

Bobsein et al.

[11] Patent Number: 4,593,081

[45] Date of Patent: Jun. 3, 1986

[54] CHAIN-TRANSFER AGENTS FOR EMULSION POLYMERIZATION AND POLYMER PRODUCTS PRODUCED THEREWITH

[75] Inventors: Rex L. Bobsein; Merlin R. Lindstrom, both of Bartlesville, Okla.

[73] Assignee: Phillips Petroleum Company, Bartlesville, Okla.

[21] Appl. No.: 727,155

[22] Filed: Apr. 25, 1985

[51] Int. Cl.$^4$ .............................................. C08F 2/38
[52] U.S. Cl. ................................ 526/211; 526/214; 525/330.4
[58] Field of Search ............................. 526/211, 214; 525/330.4

[56] References Cited

U.S. PATENT DOCUMENTS 3,696,083 10/1972 Hwa ..................................... 526/214
3,960,824 6/1976 Hicks .................................... 526/211
4,052,548 10/1977 Stanaback ........................... 526/214

Primary Examiner—Paul R. Michl
Attorney, Agent, or Firm—Stephen E. Reiter

[57] ABSTRACT

In the emulsion polymerization of acrylic monomers, an improvement comprises the use of 3-mercaptopropionate esters as chain-transfer agents. Novel polymers are produced by the inventive polymerization process.

16 Claims, No Drawings

CHAIN-TRANSFER AGENTS FOR EMULSION POLYMERIZATION AND POLYMER PRODUCTS PRODUCED THEREWITH

This invention relates to emulsion polymerization processes. In one aspect, this invention relates to chain-transfer agents for use in emulsion polymerization processes. In another aspect, this invention relates to acrylic polymers produced by emulsion polymerization. In yet another aspect this invention relates to the control of polymer molecular weight and molecular weight distribution in the emulsion polymerization processes.

BACKGROUND

The emulsion polymerization process enjoys wide usage in the chemical industry. Many monomers can be polymerized using this technology. The method combines the economy and safety of an aqueous reaction medium with a rapid but readily controlled polymerization to provide high molecular weight polymers in excellent yield. Among the advantages of emulsion polymerization are reduced fire hazard, high reaction rate, production of high molecular weight polymer relative simplicity of the technology and production of low viscosity latexes. Shortcomings of emulsion polymerizations include the relative difficulty in separating the polymer product and contamination of the polymer product with residual emulsifier.

Chain-transfer agents can be and are added to emulsion polymerization systems in order to improve final polymer properties. Chain-transfer agents are generally used in free radical polymerizations and function as molecular weight modifiers. The chain-transfer agent reacts with a growing polymer chain to form a "dead" polymer with the concurrent formation of a new center for polymer growth. The chain transfer mechanism for mercaptan containing chain-transfer agents can be depicted as follows:

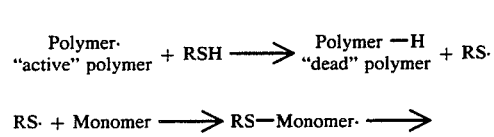

Among those polymer properties which it is desirable to control are polymer molecular weight distribution, freeze-thaw stability of the latex and polymer particle size. A narrow molecular weight distribution refers to a more nearly homogeneous polymer sample than a similar polymer blend having a broad molecular weight distribution. For many applications, polymers having a narrow molecular weight distribution is desirable.

Freeze-thaw stability refers to the ability of a latex to remain as an emulsion even when exposed to heat-cool temperature cycles. Since emulsion latexes produced from acrylic monomers are susceptible to breakdown of the emulsion when exposed to temperature extremes over a period of time, emulsion latexes which are stable to exposure to freeze-thaw conditions are desirable in that breakdown of the emulsion with resultant settling of the polymer would be avoided.

For certain applications, such as for example in coatings and adhesives, a polymer latex having a relatively uniform particle size would be desirable. It is generally observed, however, that acrylic polymers produced by emulsion polymerization have a rather broad particle size distribution, and thus are not well suited for the production of homogeneous coatings or the like.

It is a continuing goal of those in the emulsion polymerization art to discover new chain-transfer agents which are effective for molecular weight modification and which provide polymer products with improved physical properties.

OBJECTS OF THE INVENTION

An object of this invention, therefore, is a process for the control of molecular weight and molecular weight distribution of acrylic polymers produced by emulsion polymerization processes.

Another object of this invention is novel acrylic polymers having improved physical properties.

These and other objects of the invention will become apparent from the disclosure and claims provided herein.

STATEMENT OF THE INVENTION

In accordance with the present invention, we have discovered that at least one compound selected from the group consisting of 3-mercaptopropionate esters, 6-mercaptomethyl-2-methyl-2-octanol, and 2-phenyl-1-mercapto-2-ethanol are effective chain-transfer agents in emulsion polymerization of acrylic monomers. By the practice of the present invention, acrylic polymers having reduced molecular weights as well as narrow molecular weight distributions are obtained. Additional beneficial physical properties of the novel polymers produced in accordance with the present invention will be detailed in the discussion which follows.

DETAIL DESCRIPTION OF THE INVENTION

In accordance with the present invention, an emulsion polymerization process is provided comprising polymerizing at least one acrylic monomer in aqueous medium under polymerization conditions in the presence of a water soluble free-radical initiator, an emulsifier and at least one compound selected from the group consisting of 3-mercaptopropionate esters, 6-mercaptomethyl-2-methyl-2-octanol, and 2-phenyl-1-mercapto-2-ethanol as chain-transfer agent.

In accordance with another embodiment of the present invention, novel compositions are provided comprising a polymer of at least one acrylic monomer, wherein the polymer has a molecular weight in the range of 500 to 100,000, and a heterogeneity index not exceeding about 3.0; preferably the heterogeneity index will not exceed about 2.0; and most preferably the heterogeneity index will not exceed about 1.7. In addition, at least a portion of the individual molecules of the polymer are terminated by the radical:

wherein R is a carbon containing radical having 1-20 carbon atoms. As employed herein, the term "carbon containing radicals" is intended to include carbon radicals containing heteroatom substitution, by such heteroatoms as N, S, O, P, Si and B.

Acrylic monomers contemplated to be within the scope of the present invention are those which conform to the formula:

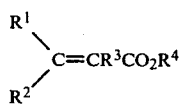

wherein each of R', $R^2$, $R^3$ and $R^4$ are independently selected from hydrogen and carbon containing radicals having 1–20 carbon atoms. Examples of monomers which conform to the above formula include ethyl acrylate, methyl acrylate, methyl methacrylate, butyl acrylate, 2-ethyl hexyl acrylate, hydroxyethyl acrylate, and the like, and mixtures of any two or more thereof.

When a copolymerization is carried out, i.e., at least one comonomer is employed along with the monomer, the comonomer(s) can be present in any desired amount, i.e., from trace amounts up to a substantial excess with respect to the monomer employed. For example, it is sometimes desired in order to achieve desirable properties in the polymer product that a termonomer be employed in the polymerization process. Thus, useful polymer products are obtained when methacrylic acid is used as a termonomer in admixture with ethyl acrylate and methyl methacrylate.

When a termonomer is employed, it is generally added in relatively small amounts, e.g., about 0.01 to 5 wt % based on the total weight of monomer (including comonomer and termonomer) charged. Preferably, the termonomer is charged in amounts ranging from about 0.1 to 2 wt %, based on the total weight of monomer charged.

Those of skill in the art recognize that additional comonomers can be employed, so that copolymers comprising mixtures of three, four or more monomers satisfying the above definition are within the contemplation of the present invention.

Suitable free radical initiators are well known in the art and can be readily chosen by the artisan. Exemplary materials include water soluble initiators, such as, for example, peroxygen compounds, especially inorganic persulfate compounds such as for example ammonium persulfate, potassium persulfate and sodium persulfate; peroxides such as for example hydrogen peroxide; organic hydroperoxides, such as for example cumene hydroperoxide t-butyl hydroperoxide, acetyl peroxide, lauroyl peroxide; peracetic acid and perbenzoic acid; redox initiators wherein a water soluble reducing agent such as a ferrous compound promotes the decomposition of peroxides, persulfates and the like; as well as other free radical producing materials such as 2,2'-azobisisobutyronitrile, 4,4'-azobis(4-cyanovaleric acid), and the like.

A wide variety of emulsifiers are useful in the practice of the present invention, as can readily be determined by one of skill in the art. Suitable emulsifying agents include cationic, anionic or nonionic emulsifiers or detergents customarily used in emulsion polymerizations. Representative types of emulsifiers are the alkyl aryl sulfonates, alkali metal alkyl sulfates, sulfonated alkyl esters, salts of high molecular fatty acids, amine soaps, alkaline metal salts of rosin acids, ethylene oxide condensates of long chain fatty acids, alcohols or mercaptans.

The chain-transfer agents employed in the practice of the present invention are selected from the group consisting of 3-mercaptopropionate esters which conform to the formula:

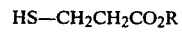

HS—CH$_2$CH$_2$CO$_2$R wherein R is a carbon containing radical having 1–20 carbon atoms, 6-mercaptomethyl-2-methyl-2-octanol and 2-phenyl-1-mercapto-2-ethanol. Examples of mercaptopropionates which conform to the above formula include
methyl-3-mercaptopropionate,
butyl-3-mercaptopropionate,
i-octyl-3-mercaptopropionate,
i-decly-3-mercaptopropionate,
dodecyl-3-mercaptopropionate,
octadecyl-3-mercaptopropionate,
2-ethyl hexyl-3-mercaptopropionate,
and the like, as well as mixtures of any two or more thereof.

One skilled in the art can readily determine an effective amount of chain-transfer agent to employ in order to achieve the desired degree of molecular weight control. It is of course recognized that the amount of chain-transfer agent employed will vary based on the particular chain-transfer agent, the particular monomer or mixture of monomers employed, the initiator employed, the polymerization reaction conditions, etc. Generally, 0.01–20 moles of chain-transfer agent per 100 moles monomer will be employed. Preferably, about 0.1–10 moles of chain-transfer agent per 100 moles of monomer will be employed.

The particular chain-transfer agent employed in the practice of the present invention can be selected as a function of the degree of molecular weight control desired and the solubility of the chain-transfer agent with respect to the acrylic monomer or monomers undergoing polymerization.

The polymerization process of the present invention can be carried out batchwise, stepwise or continuously with batch and/or continuous addition of monomers and/or reagents in a conventional manner as readily determined by those of skill in the art. Preferably, the polymerization reaction is carried out by concurrent addition of monomer along with additional reaction components and an aqueous feed into an aqueous phase which has been preheated to between about 40° C. and 100° C. and maintained under agitation. Addition rates may vary and can range from about 0.1 hour to 10 hours, with about 0.3 to 1 hour being most preferred. The system is allowed to react in total for about 0.1 to 10 hours before cooling for product recovery.

In order to successfully carry out free radical initiated polymerization reaction, it is highly desirable that the reaction be carried out in the substantial absence of oxygen. Preferably, the polymerization reaction will be carried out under an inert atmosphere.

The novel polymers of the present invention can be characterized as polymers having at least one monomer of the formula

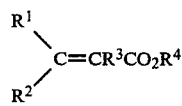

wherein each of R', $R^2$, $R^3$ and $R^4$ are independently selected from hydrogen and carbon containing radicals having 1–20 carbon atoms. The novel polymers of the invention have a molecular weight in the range of about 500 to 100,000 as determined by high resolution gel permeation chromatography, and a heterogeneity index not exceeding about 3.0. Preferably the heterogeneity index will not exceed about 2.0; and most preferably the heterogeneity index will not exceed about 1.7. The "heterogeneity index" as employed herein is calculated as Mw/Mn, i.e., by dividing polymer weight average molecular weight (Mw) by polymer number average molecular weight (Mn) wherein Mw and Mn are determined by high resolution gel permeation chromatography. At least a portion of the individual molecules of the novel polymers of the present invention are terminated by the radical having the formula $$-S-CH_2CH_2CO_2R$$

wherein R is a carbon containing radical having 1-20 carbon atoms.

The novel polymers of the present invention are useful in a variety of applications, such as for example, in coatings, adhesives, textiles, paper, polishes, leather treatment, sealants, and the like.

The novel polymers of the present invention have several unique and useful properties. For example, a polymer latex prepared from a mixture of ethyl acrylate, methyl methacrylate and methacrylic acid, and then basified to a pH in the range of 7-10 with ammonium hydroxide, produces an exceptionally freeze-thaw stable latex.

A further advantageous property of the novel polymer products produced by the process of the present invention is the relatively narrow particle size distribution of the polymer product. For example, when a mixture of ethyl acrylate, methyl methacrylate and methacrylic acid (2:1:0.03 weight ratio) was subjected to emulsion polymerization conditions in the absence of a chain-transfer agent, product polymer particle size ranged generally from about 0.5 to 5 μm. When terpolymer of the same molar proportions was prepared in accordance with the present invention employing butyl 3-mercaptopropionate as the chain transfer agent, the particle size varied within the much narrower range of about 0.25 to 1 μm.

A further understanding of the present invention and its advantages will be provided by reference to the following nonlimiting examples.

EXAMPLES

The general procedure employed for all polymerization reactions was as follows:

The reaction mixture was prepared by adding 28.5 g Triton X-200, 240 g water, 242 g monomer (usually only ethyl acrylate (EA) or 121 g EA and 121 g methyl methacrylate (MMA)), 0.480 g ammonium persulfate and 0-8 mphm (moles per hundred monomer) chain-transfer agent (CTA) into screw capped glass bottle. (Sometimes 10-30 mg of EDTA were added prior to CTA addition.) The mixture was then shaken. Sixty mL of the above mixture was added to a reaction flask which was a 1 L resin kettle fitted with a reflux condenser, a mechanical stirrer, a thermocouple probe and an argon bubbler. Then 60 mL of H₂O was added to the reaction flask. The remaining emulsion mixture was put into an addition funnel for later use. The ~120 mL of material in the reactor is termed the "seed". The temperature was increased over a period of about 0.5 hour to reflux (82°-86° C.) with a stirring rate of 540 rpm. The controller set point was 90° C. When seed material in the reactor had reached reflux temperature, introduction of the remaining emulsion mixture from the addition funnel was commenced. The addition rate was adjusted so that addition was complete after exactly 1.5 hours. When addition was complete, 0.08 of ammonium persulfate in ~3 g H₂O was quickly added and the set point was adjusted to 93° C. Fifteen minutes later, the set point was increased to 98° C. One hour after the completion of addition, the set point was increased to 100° C. Exactly 2 hours after the completion of addition, the heating was terminated and the reaction mixture was allowed to cool with stirring to 25°-35° C. The reaction mixture was then strained through cheesecloth.

A weighed sample of the reaction mixture was dried in a vacuum oven. When the bulk of the water was removed, the sample was heated to ~105° C. at 22 inches Hg vacuum for 3 hours. The resulting dried sample was weighed. Percent solids can then be calculated.

Mw and Mn values, and heterogeneity index calculated therefrom, were determined employing high resolution gel permeation chromatography of the latex samples, which results were then matched to calibration curves based on polybutadiene standards. The calibration curve for weight average molecular weights were prepared by subjecting known molecular weight standards to light scattering measurements while the calibration curve for number average molecular weights were prepared by subjecting known molecular weight standards to membrane osmometry. Vapor pressure osmometry was used to determine the number average molecular weights for the low molecular weight standards.

EXAMPLE 1

A series of polymerization reactions was carried out in accordance with the general procedure set forth above employing 2.4 moles of a 50/50 weight ratio mixture of ethyl acrylate and methyl methacrylate. The total reagent charge consisted of the following approximate ratios:

| | |
|---|---|
| Water | 1 part |
| Total monomer | 0.8 parts |
| Emulsifier (Tritron X-200) | 0.096 parts |
| Initiator (ammonium persulfate) | 0.0016 |
| EDTA (ethylenediamine tetraacetic acid) | 20-30 ppm |

The specific amounts of emulsifier, initiator and chain-transfer agent employed in each run are summarized in Table I.

TABLE I

| | | | | | | | | | |
|---|---|---|---|---|---|---|---|---|---|
| | Emulsion Polymerization of EA/MMA | | | | | | | | |
| Run | Chain-Transfer Agent*, mphm | Emulsifier, g | Initiator, mphm | % Conv. | % Solids Calcd. | % Solids Found | Mw (× 1000) | Mn (× 1000) | HI |
| 1 | None | 28.7 | 0.102 | 99.8 | 43.8 | 43.7 | 571.0 | 145.0 | 3.90 |
| 2 | BME, 4.1 | 28.8 | 0.101 | 33.9 | 44.6 | 15.1 | 6.3 | 2.3 | 2.70 |
| 3 | 3-MP, 4.0 | 28.3 | 0.101 | 29.1 | 44.3 | 12.9 | 4.6 | 2.0 | 2.30 |
| 4 | t-NM, 4.0 | 28.4 | 0.102 | 97.8 | 45.2 | 44.2 | 3.9 | 1.9 | 2.00 |

TABLE I-continued

Emulsion Polymerization of EA/MMA

| Run | Chain-Transfer Agent*, mphm | Emulsifier, g | Initiator, mphm | % Conv. | % Solids Calcd. | % Solids Found | Mw (× 1000) | Mn (× 1000) | HI |
|---|---|---|---|---|---|---|---|---|---|
| 5 | t-DDM, 3.5 | 28.3 | 0.102 | 97.8 | 45.4 | 44.4 | 4.6 | 2.3 | 2.00 |
| 6 | 4-MMB, 4.0 | 28.4 | 0.102 | 51.9 | 44.9 | 23.3 | 3.1 | 1.7 | 1.86 |
| 7 | TGA, 4.0 | 28.4 | 0.102 | 78.9 | 44.6 | 35.2 | 6.4 | 3.0 | 2.20 |
| 8 | MTG, 4.0 | 29.0 | 0.102 | 95.3 | 44.7 | 42.6 | 3.6 | 2.0 | 1.83 |
| 9 | BTG, 4.0 | 28.5 | 0.101 | 99.3 | 45.2 | 44.9 | 3.2 | 1.7 | 1.89 |
| 10 | OTG, 4.0 | 28.5 | 0.101 | 97.4 | 45.6 | 44.4 | 3.0 | 1.8 | 1.71 |
| 11 | DDTG, 4.0 | 28.6 | 0.101 | 96.5 | 46.1 | 44.5 | 3.3 | 1.9 | 1.72 |
| 12 | ODTG, 4.1 | 28.3 | 0.101 | 98.9 | 46.9 | 46.4 | 38.0 | 15.0 | 2.60 |
| 13 | 6-MMMO, 4.0 | 29.1 | 0.102 | 97.6 | 45.4 | 44.3 | 3.1 | 1.8 | 1.75 |
| 14 | 2-PME, 4.0 | 28.9 | 0.102 | 98.7 | 45.1 | 44.5 | 3.3 | 1.8 | 1.85 |
| 15 | M—3-MP, 4.0 | 28.7 | 0.100 | 95.3 | 45.0 | 42.9 | 3.1 | 1.8 | 1.73 |
| 16 | B—3-MP, 4.0 | 28.4 | 0.102 | 99.3 | 45.3 | 45.0 | 3.0 | 1.8 | 1.64 |
| 17 | O—3-MP, 4.0 | 29.0 | 0.101 | 98.9 | 45.8 | 45.3 | 3.0 | 1.9 | 1.59 |
| 18 | D—3-MP, 4.0 | 29.1 | 0.102 | 96.5 | 45.8 | 44.2 | 3.2 | 1.9 | 1.70 |
| 19 | DD—3-MP, 4.0 | 28.4 | 0.102 | 96.1 | 46.2 | 44.4 | 3.5 | 2.1 | 1.64 |
| 20 | OD—3-MP, 4.0 | 28.6 | 0.102 | 93.8 | 46.9 | 44.0 | 56.0 | 23.0 | 2.50 |

*Legend:
BME = β-mercaptoethanol
3-MP = 3-mercaptopropanol
t-NM = t-nonylmercaptan
t-DDM = t-dodecylmercaptan
6-MMMO = 6-mercaptomethyl-2-methyl-2-octanol
4-MMB = 4-mercapto-3-methyl-1-butanol
2-PME = 2-phenyl-1-mercapto-2-ethanol
TGA = thioglycolic acid
MTG = methyl thioglycolate
BTG = n-butyl thioglycolate
OTG = i-octyl thioglycolate
DDTG = dodecyl thioglycolate
ODTG = octadecyl thioglycolate
M—3-MP = methyl-3-mercaptopropionate
B—3-MP = butyl-3-mercaptopropionate
O—3-MP = i-octyl-3-mercaptopropionate
D—3-MP = i-decyl-3-mercaptopropionate
DD—3-MP = dodecyl-3-mercaptopropionate
OD—3-MP = octadecyl-3-mercaptopropionate Runs 1–12 of Table I are control and comparison runs, while runs 13–20 are invention runs. Run 1 demonstrates that very high molecular weight polymer (Mw=571,000) is produced in the absence of chain-transfer agent. The % conversion for several of the comparison runs, e.g. runs 2, 3 and 6 are quite low, indicating that β-mercaptoethanol, 3-mercaptopropanol and 4-mercapto-3-methyl-1-butanol are not satisfactory chain transfer agents for the emulsion polymerization of EA/MMA comonomers. While the glycolate esters (runs 8–12) do provide relatively good molecular weight control, none of the esters tested gave a polymer product with a heterogeneity index (HI) of less than 1.71. Only the invention runs employing 3-mercaptopropionate esters as chain transfer agents produced polymer products with a HI of 1.70 or below. Such results represent outstanding control of polymer molecular weight distribution. Note that even where the water solubility of the chain transfer agent becomes more limited, e.g. octadecyl-3-mercaptopropionate, the degree of molecular weight control is superior than that obtained with an analogous long chain ester, octadecyl thioglycolate (compare runs 12 and 20).

EXAMPLE II

Additional polymerization reactions were carried out in accordance with the general procedure set forth above. The monomer charge ratio and total reagent charge employed was the same as employed in Example I, except no EDTA was employed. Specific reagent quantities employed and polymerization results are summarized in Table II.

TABLE II

Emulsion Polymerization of EA/MMA with No Added EDTA

| Run | Chain Transfer agent*, mphm | EDTA | Reagent Charge Emulsifier, g | Initiator, mphm | % Conv. | % Solids Calcd. | % Solids Found | Mw (× 1000) | Mn (× 1000) | HI |
|---|---|---|---|---|---|---|---|---|---|---|
| 5 | t-DDM, 3.5 | Yes | 28.3 | 0.102 | 97.8 | 45.4 | 44.4 | 4.6 | 2.3 | 2.00 |
| 21 | t-DDM, 4.0 | No | 28.5 | 0.102 | 96.7 | 45.5 | 44.0 | 4.3 | 2.0 | 2.20 |
| 22 | t-DDM, 4.0 | No | 28.6 | 0.102 | 96.9 | 45.5 | 44.1 | 4.5 | 2.1 | 2.10 |
| 15 | M—3-MP, 4.0 | Yes | 28.7 | 0.100 | 95.3 | 45.0 | 42.9 | 3.1 | 1.8 | 1.73 |
| 23 | M—3-MP, 4.0 | No | 28.5 | 0.102 | 96.9 | 44.7 | 43.3 | 3.1 | 1.8 | 1.70 |
| 16 | B—3-MP, 4.0 | Yes | 28.4 | 0.102 | 99.3 | 45.3 | 45.0 | 3.0 | 1.8 | 1.64 |
| 24 | B—3-MP, 4.1 | No | 28.6 | 0.102 | 98.9 | 45.3 | 44.8 | 3.0 | 1.7 | 1.78 |

*t-DDM = t-dodecyl mercaptan
M—3-MP = methyl-3-mercaptopropionate
B—3-MP = butyl-3-mercaptopropionate The results summarized in Table II suggest that the emulsion polymerization of EA/MMA is relatively insensitive to the presence of EDTA. Comparison runs 5, 21 and 22 demonstrate that polymer yields are consistently reduced and HI consistently increased in the absence of EDTA (which functions to prevent premature polymerization of monomer if reducible iron impurities are present in the reaction mixture). Invention runs 15 and 23 as well as 16 and 24 demonstrate that comparable result are obtained in the presence or absence of EDTA.

EXAMPLE III

Several emulsion polymerization reactions were carried out in accordance with the general procedure set forth above, employing varying amounts of chain-transfer agent, in order to determine the effect of such variation on the degree of molecular weight control. Specific reagent quantities employed and polymerization results are summarized in Table III.

amounts of chain-transfer agent, the molecular weight distribution, as measured by HI, is also significantly reduced when higher levels of chain-transfer agent are employed. Thus, run 31 gave a polymer with an HI of only 1.51, while run 37 gave a polymer with an HI of only 1.48. These results demonstrate excellent molecular weight control is possible with 3-mercaptopropionate esters as chain-transfer agents.

EXAMPLE IV

Several polymerization reactions were carried out to determine the effect of using different emulsifiers and initiators with 3-mercaptopropionate esters in accor-

TABLE III

Effect of Chain-Transfer agent concentration on Emulsion Polymerization of EA/MMA

| Run | Chain Transfer agent*, mphm | EDTA | Reagent Charge Emulsifier, g | Initiator, mphm | % Conv. | % Solids Calcd. | Found | Mw (× 1000) | Mn (× 1000) | HI |
|---|---|---|---|---|---|---|---|---|---|---|
| 25 | t-DDM, 1.0 | No | 28.6 | 0.102 | 99.8 | 44.0 | 43.9 | 15.2 | 7.8 | 1.94 |
| 26 | t-DDM, 4.0 | No | 28.6 | 0.102 | 96.9 | 45.5 | 44.1 | 4.5 | 2.1 | 2.10 |
| 27 | t-DDM, 8.0 | No | 28.6 | 0.102 | 93.6 | 47.1 | 44.1 | 2.3 | 1.2 | 1.88 |
| 28 | M—3-MP, 1.0 | No | 28.5 | 0.102 | 98.9 | 44.0 | 43.5 | 13.3 | 6.9 | 1.93 |
| 29 | M—3-MP, 2.0 | No | 28.8 | 0.102 | 96.4 | 44.1 | 42.5 | 6.1 | 3.3 | 1.84 |
| 30 | M—3-MP, 4.0 | No | 28.5 | 0.102 | 96.9 | 44.7 | 43.3 | 3.1 | 1.8 | 1.70 |
| 31 | M—3-MP, 8.1 | No | 28.6 | 0.101 | 87.8 | 45.9 | 40.3 | 1.6 | 1.1 | 1.51 |
| 32 | B—3-MP, 0.27 | No | 28.6 | 0.102 | 99.8 | 43.8 | 43.7 | 45.0 | 23.0 | 1.99 |
| 33 | B—3-MP, 0.5 | No | 28.6 | 0.101 | 99.8 | 43.9 | 43.8 | 22.2 | 11.7 | 1.90 |
| 34 | B—3-MP, 4.0 | No | 28.6 | 0.051 | 96.5 | 45.2 | 43.6 | 2.9 | 1.7 | 1.74 |
| 35 | B—3-MP, 1.0 | Yes | 28.8 | 0.102 | 98.2 | 44.2 | 43.4 | 14.0 | 6.6 | 2.10 |
| 36 | B—3-MP, 2.1 | Yes | 28.6 | 0.102 | 99.8 | 44.5 | 44.4 | 7.0 | 3.7 | 1.91 |
| 16 | B—3-MP, 4.0 | Yes | 28.4 | 0.102 | 99.3 | 45.3 | 45.0 | 3.0 | 1.8 | 1.64 |
| 37 | B—3-MP, 8.1 | Yes | 28.7 | 0.102 | 99.1 | 46.8 | 46.4 | 1.5 | 1.0 | 1.48 |

*t-DDM = t-dodecylmercaptan
M—3-MP = methyl-3-mercaptopropionate
B—3-MP = butyl-3-mercaptopropionate Comparison runs 25–27 demonstrate that the HI for t-dodecylmercaptan is relatively insensitive to concentration of chain-transfer agent. Thus, over an 8-fold variation in chain-transfer agent concentration, the HI is consistently about 2. The several series of invention runs, i.e. 28–31; 32–34; and 34–37, demonstrate a substantial degree of molecular weight control. Not only are the absolute molecular weights (Mw and Mn) reduced, as expected, upon incorporation of greater dance with the present invention. Reagents employed and polymerization results are summarized in Table IV. In addition, several polymerization reactions which have already been reported were repeated to determine the reproducibility of the experimental and analytical techniques employed. Results of these comparisons are presented in Table V. All reactions were carried out in accordance with the general procedure set forth above.

TABLE IV

Use of Alternate Emulsifiers, Initiators in Emulsion Polymerization of EA/MMA

| Run | Chain-Transfer agent*, mphm | Reagent Charge Emulsifier**, g | Initiator***, mphm | % Conv. | % Solids Calcd. | Found | Mw (× 1000) | Mn (× 1000) | HI |
|---|---|---|---|---|---|---|---|---|---|
| 16 | B—3-MP, 4.0 | X-200, 28.4 | AP, 0.102 | 99.3 | 45.3 | 45.0 | 3.0 | 1.8 | 1.64 |
| 38 | B—3-MP, 4.0 | SDS, 8.0 | AP, 0.101 | 81.7 | 45.3 | 37.0 | 3.0 | 2.0 | 1.5 |
| 39 | B—3-MP, 4.0 | X-200, 28.7 | PP, 0.102 | 99.1 | 45.5 | 45.1 | 3.1 | 1.7 | 1.77 |

*B—3-MP = butyl-3-mercaptopropionate
**X-200 = Triton X-200
SDS = Sodium dodecyl sulfate
***AP = Ammonium persulfate
PP = Potassium persulfate

TABLE V

Reproducibility of Polymerization Reactions and Analyses for Emulsion Polymerization of EA/MMA

| Run | Chain-Transfer agent*, mphm | Reagent Charge Emulsifier, g | Initiator, mphm | % Conv. | % Solids Calcd. | Found | Mw (× 1000) | Mn (× 1000) | HI |
|---|---|---|---|---|---|---|---|---|---|
| 15 | M—3-MP, 4.0 | 28.7 | 0.100 | 95.3 | 45.0 | 42.9 | 3.1 | 1.8 | 1.73 |
| 40 | M—3-MP, 4.0 | 28.5 | 0.102 | 96.9 | 45.0 | 43.6 | 3.0 | 1.7 | 1.76 |
| 34 | B—3-MP, 4.0 | 28.6 | 0.051 | 96.5 | 45.2 | 43.6 | 2.9 | 1.7 | 1.74 |

TABLE V-continued

| | | Reproducibility of Polymerization Reactions and Analyses for Emulsion Polymerization of EA/MMA | | | | | | | |
|---|---|---|---|---|---|---|---|---|---|
| | | Reagent Charge | | | | | | | |
| Run | Chain-Transfer agent*, mphm | Emulsifier, g | Initiator, mphm | % Conv. | % Solids Calcd. | % Solids Found | Mw (× 1000) | Mn (× 1000) | HI |
| 41 | B—3-MP, 4.0 | 28.8 | 0.026 | 84.7 | 45.2 | 38.3 | 3.0 | 1.7 | 1.77 |

*M—3-MP = methyl-3-mercaptopropionate
B—3-MP = butyl-3-mercaptopropionate

The results presented in Table IV demonstrate that excellent molecular weight control is achieved with butyl-3-mercaptopropionate as chain-transfer agent, regardless of the emulsifier or initiator employed.

The results presented in Table V demonstrate that degree of molecular weight control is very reproducible, there being less than 2% variation in the HI results for repeat runs 15 and 40; with similar reproducibility (i.e., within 2%) even where widely varied initiator levels are employed (see runs 34 and 41).

EXAMPLE V

Several terpolymerization reactions were carried out employing ethyl acrylate, methyl methacrylate and methacrylic acid in varying ratios, as summarized in Tables VI and VII. Reactions were carried out in accordance with the general procedure set forth above.

indication of the degree of molecular weight control possible with 3-mercaptopropionate esters as chain-transfer agents.

The results presented in Table VII demonstrate that excellent molecular weight control is achieved over a wide range of termonomer ratios.

Each of the termonomer solutions produced in runs 42–52 were adjusted to pH of about 8.5–9.5 with ammonium hydroxide and subjected to several freeze-thaw cycles. The emulsions were than visually inspected to see if substantial settling had occurred or if the polymer latex remained suspended.

Control runs 44 and 45 produced latex product which underwent substantial settling during the freeze-thaw threatment. Of the invention runs (43 and 46–52) all but run 49 gave exceptionally freeze-thaw stable emulsions. Thus, where EA/MMA monomer ratios are at least 1:1,

TABLE VI

| | | | Emulsion Polymerization of EA/MMA/MAA | | | | | | | |
|---|---|---|---|---|---|---|---|---|---|---|
| | | | Reagent Charge | | | | | | | |
| Run | Monomer ratio EA:MMA:MAA | Chain-transfer agent*, mphm | Emulsifier, g | Initiator, mphm | % conv. | % Solids Calcd. | % Solids Found | Mw (× 1000) | Mn (× 1000) | HI |
| 42** | 2:1:0.037 | None | 28.9 | 0.102 | 99.1 | 44.0 | 43.6 | —ND***— | | |
| 43** | 2:1:0.033 | B—3-MP, 4.0 | 28.9 | 0.101 | 98.9 | 45.5 | 45.0 | 3.1 | 1.5 | 1.85 |
| 44 | 2:1:0.036 | 1-HT, 4.0 | 28.5 | 0.101 | 98.9 | 45.1 | 44.6 | 3.3 | 1.7 | 1.83 |
| 45 | 2:1:0.036 | t-DDM, 4.0 | 28.6 | 0.101 | 96.5 | 45.9 | 44.3 | 4.0 | 2.1 | 1.90 |
| 46 | 2:1:0.035 | M—3-MP, 4.0 | 28.5 | 0.101 | 97.3 | 45.0 | 43.8 | 3.0 | 1.8 | 1.71 |
| 47 | 2:1:0.035 | B—3-MP, 4.0 | 28.5 | 0.101 | 100 | 45.4 | 45.4 | 4.5 | 1.8 | 2.40 |
| 48 | 2:1:0.038 | O—3-MP, 4.0 | 28.8 | 0.101 | 97.0 | 46.0 | 44.6 | 3.0 | 1.7 | 1.74 |

*B—3-MP = Butyl-3-mercaptopropionate
1-HT = 1-hexanethiol
t-DDM = t-dodecylmercaptan
M—3-MP = methyl-3-mercaptopropionate
O—3-MP = i-octyl-3-mercaptopropionate
**Run included 20–30 ppm of EDTA
***Not determined; polymer product could not be analyzed because it was insoluble, presumably due to very high molecular weight (~1,000,000).

TABLE VII

| | | | Effect of Varying Relative Monomer Ratio on Emulsion Polymerization of EA/MMA/MAA | | | | | | | |
|---|---|---|---|---|---|---|---|---|---|---|
| | | | Reagent Charge | | | | | | | |
| Run | Monomer ratio EA:MMA:MAA | Chain-transfer agent*, mphm | Emulsifier, g | Initiator, mphm | % conv. | % Solids Calcd. | % Solids Found | Mw (× 1000) | Mn (× 1000) | HI |
| 49 | 1:2:0.036 | B-3-MP, 4.0 | 28.7 | 0.100 | 99.3 | 45.2 | 44.9 | 2.9 | 1.7 | 1.72 |
| 50 | 1:1:0.020 | B-3-MP, 4.0 | 28.7 | 0.102 | 98.9 | 45.0 | 44.5 | 3.0 | 1.7 | 1.75 |
| 51 | 2:1:0.022 | B-3-MP, 4.0 | 28.6 | 0.102 | 98.9 | 45.4 | 44.9 | 3.2 | 1.8 | 1.83 |
| 47 | 2:1:0.035 | B-3-MP, 4.0 | 28.5 | 0.101 | 100 | 45.4 | 45.4 | 4.5 | 1.8 | 2.40 |
| 52 | 2:1:0.071 | B-3-MP, 4.0 | 28.6 | 0.101 | 98.6 | 45.3 | 44.6 | 2.8 | 1.6 | 1.80 |

*B-3-MP = butyl-3-mercaptopropionate

The results in Table VI demonstrate that some chain-transfer agent is required to control polymer molecular weight, otherwise insoluble, high molecular weight polymer is obtained. In all cases, good molecular weight control is achieved when chain-transfer agent is employed, especially in invention runs 46 and 48. Although comparison runs 44 and 45 give good HI values, note that the absolute weight average molecular weights are consistently higher than Mw values obtained in invention runs 43, 46 and 48, which is further and 3-mercaptopropionate esters are employed as chain transfer agents, very stable emulsions are produced.

The emulsions produced in runs 42 and 43 were further characterized by observing the range of polymer particle size under the microscope. Control emulsion 42 displayed a wide variation in polymer particle size, ranging from about 0.5 to about 5 μm. In contrast, invention emulsion 43 displayed a much narrower range

We claim:

1. An emulsion polymerization process which comprises polymerizing in aqueous medium under polymerization conditions at least one acrylic monomer having the formula:

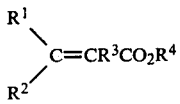

wherein R', $R^2$, $R^3$, and $R^4$ are each independently selected from hydrogen and carbon containing radicals having 1–20 carbon atoms, in the presence of:
 (i) a water soluble free-radical initiator,
 (ii) an emulsifier, and
 (iii) at least one chain-transfer agent selected from the group consisting of compounds having the formula:

$$HS-CH_2CH_2CO_2R$$

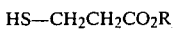

wherein R is a carbon containing radical having 1–20 carbon atoms, 6-mercaptomethyl-2-methyl-2-octanol, and 2-phenyl-1-mercapto-2-ethanol.

2. A process in accordance with claim 1 wherein said polymerization conditions comprise a temperature in the range of 40° to 100° C. for a time period in the range of 0.1 to 10 hours.

3. A process in accordance with claim 1 wherein said at least one monomer is ethyl acrylate.

4. A process in accordance with claim 1 wherein said at least one monomer comprises a mixture of ethyl acrylate and methyl methacrylate.

5. A process in accordance with claim 4 wherein the molar ratio of ethyl acrylate to methyl methacrylate ranges from about 1:10 to 10:1.

6. A process in accordance with claim 1 wherein said at least one monomer comprises a mixture of ethyl acrylate, methyl methacrylate and methacrylic acid.

7. A process in accordance with claim 6 wherein the weight % of methacrylic acid ranges from about 0.01 to 5 wt % based on the total weight of monomer charged.

8. A process in accordance with claim 1 wherein the chain-transfer agent is selected from the group consisting of:
methyl 3-mercaptopropionate,
butyl 3-mercaptopropionate,
i-octyl 3-mercaptopropionate,
decyl 3-mercaptopropionate,
dodecyl 3-mercaptopropionate,
2-ethyl hexyl 3-mercaptopropionate,
octadecyl 3-mercaptopropionate,
and mixtures of any two or more thereof.

9. A process in accordance with claim 1 wherein said chain transfer agent is present in the range of about 0.01 to 20 moles per hundred mole monomer.

10. A process in accordance with claim 1 wherein said water soluble free-radical initiator is an inorganic persulfate compound.

11. A composition of matter comprising a polymer of at least one monomer having the formula:

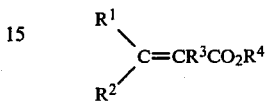

wherein each of R', $R^2$, $R^3$ and $R^4$ are independently selected from hydrogen and carbon containing radicals having 1–20 carbon atoms; wherein said polymer has a molecular weight in the range of 500 to 100,000 as determined by high resolution gel permeation chromatography; wherein said polymer has a heterogeneity index not exceeding about 3.0, wherein said heterogeneity index is calculated as Mw/Mn; and wherein at least a portion of the individual molecules of said polymer are terminated by the radical having the formula $$-S-CH_2CH_2CO_2R$$

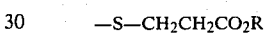

wherein R is a carbon containing radical having 1–20 carbon atoms.

12. A composition in accordance with claim 11 wherein said at least one monomer is ethyl acrylate.

13. A composition in accordance with claim 11 wherein said at least one monomer comprises a mixture of ethyl acrylate and methyl methacrylate in a molar ratio ranging from about 0.1 to 10:1.

14. A composition in accordance with claim 13 further comprising methacrylic acid; wherein the methacrylic acid ranges from about 0.01 to 5 wt % based on the total weight of monomer charged.

15. A composition in accordance with claim 10 wherein 0.001 to 0.1 of the individual polymer molecules are terminated by the radical having the formula:

$$-S-CH_2CH_2CO_2R.$$

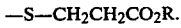

16. A composition in accordance with claim 11 wherein R is selected from the group consisting of:
 -methyl,
 -butyl,
 -i-octyl,
 -decyl
 -dodecyl,
 2-ethyl hexyl,
 octadecyl,
and mixtures of any two or more thereof.

* * * * *